United States Patent
Rihaczek

(12)
(10) Patent No.: US 6,744,731 B1
(45) Date of Patent: Jun. 1, 2004

(54) METHOD FOR OFFERING AND KEEPING READY NETWORK CAPACITY AS WELL AS NETWORK MANAGEMENT UNIT FOR IMPLEMENTING THE METHOD

(75) Inventor: Clemens Rihaczek, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/335,178

(22) Filed: Jun. 17, 1999

(30) Foreign Application Priority Data

Jun. 19, 1998 (DE) ......................................... 198 27 347

(51) Int. Cl.[7] ............................................. H04L 12/26
(52) U.S. Cl. ..................... 370/235; 370/231; 370/232; 370/468
(58) Field of Search ........................ 370/229, 230–235, 370/236, 252, 253, 465, 468, 477, 321, 4

(56) References Cited

U.S. PATENT DOCUMENTS

| | | | |
|---|---|---|---|
| 5,295,139 A | * 3/1994 | Palmer ....................... | 370/255 |
| 5,392,344 A | * 2/1995 | Ash et al. ............... | 379/221.07 |
| 5,557,611 A | * 9/1996 | Cappellari et al. ..... | 370/395.43 |
| 5,878,029 A | * 3/1999 | Hasegawa et al. .......... | 370/236 |
| 6,097,722 A | * 8/2000 | Graham et al. ........ | 370/395.21 |
| 6,249,816 B1 | * 6/2001 | Kilkki ........................ | 709/223 |
| 6,314,103 B1 | * 11/2001 | Medhat et al. ........... | 370/395.2 |
| 6,333,936 B1 | * 12/2001 | Johansson et al. .......... | 370/449 |
| 6,359,861 B1 | * 3/2002 | Sui et al. .................... | 370/230 |
| 6,385,172 B1 | * 5/2002 | Kataria et al. .............. | 370/238 |
| 6,452,933 B1 | * 9/2002 | Duffield et al. ............. | 370/415 |
| 2001/0012271 A1 | * 8/2001 | Berger ........................ | 370/230 |

FOREIGN PATENT DOCUMENTS

DE 196 34 271 A1 2/1998

OTHER PUBLICATIONS

Baardsgaard L et al: "Flexibles Digitalnetz Wirtschaftlich Verwalten", Telcom Report, Siemens AG, Munich, Germany, vol. 14, No. 6, Dec. 1, 1991, pp. 314–317, XP000247875, ISSN: 0344–4724.

Baardsgaard L et al: "Bedarfsgerechte Uebertragungskapazitaet Elektronisch Bereitstellen", Telcom Report, Siemens AG, Munich, Germany, vol. 14, No. 5, Sep. 1, 1991, pp. 254–257, XP000233997, ISSN: 0344–4724.

* cited by examiner

Primary Examiner—Douglas Olms
Assistant Examiner—Van Nguyen
(74) Attorney, Agent, or Firm—Sughrue Mion, PLLC

(57) ABSTRACT

A method for offering and keeping ready network capacity in a telecommunications network, wherein network capacity (Ch1, Ch2, Ch3) offered by a network operator to a potential consumer is entered in a network management unit, wherein a parameter (100%, 50%, 80%) for the probability of offer acceptance specified by the network operator is entered, the network management unit weights the offered network capacity with this parameter, wherein the network capacity thus weighted is added to values previously taken into account and stored in the data memory, and the network management unit blocks the total offered weighted network capacity as stored in the data memory. Also described is a network management unit for implementing the method.

10 Claims, 1 Drawing Sheet

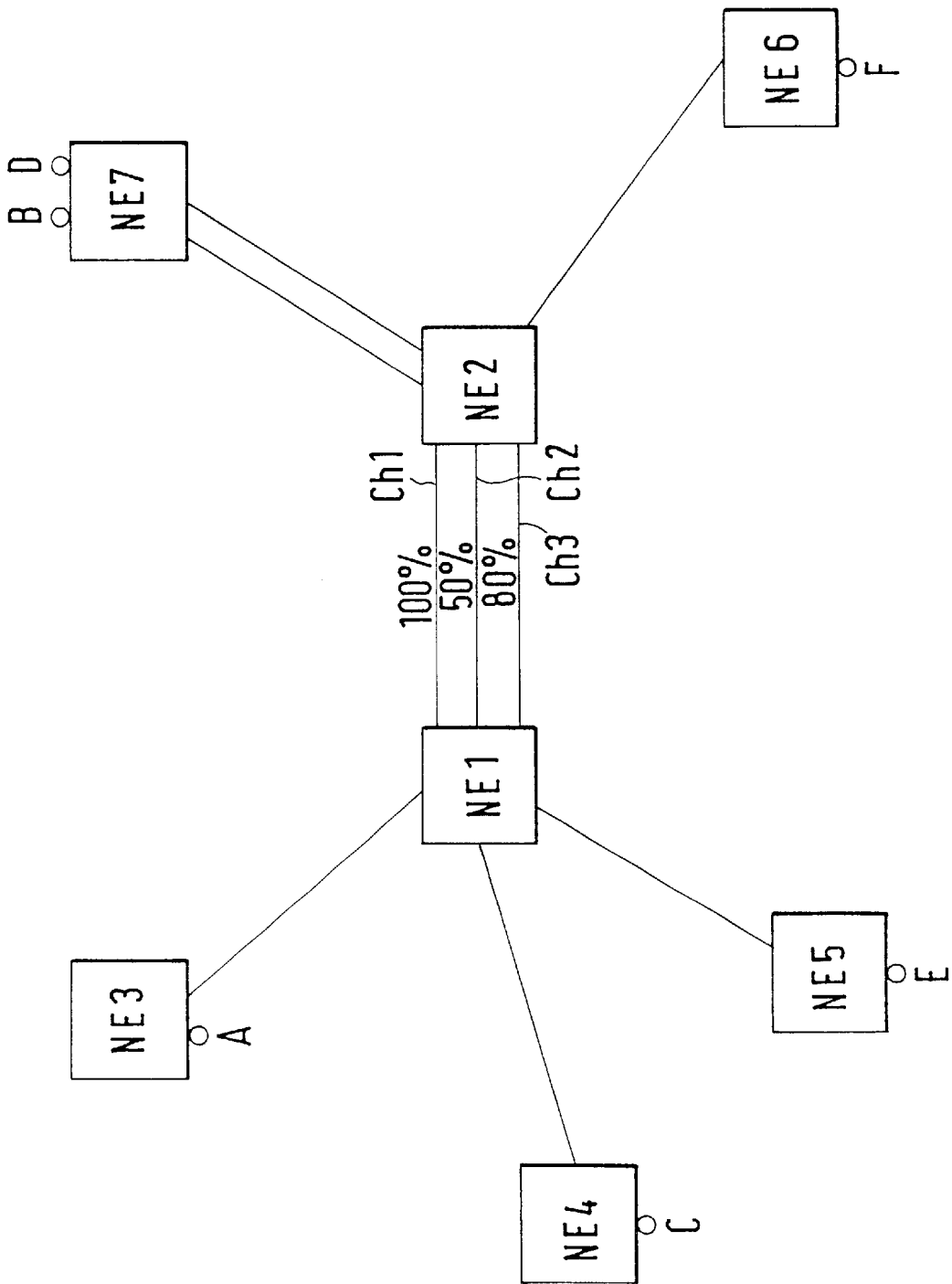

METHOD FOR OFFERING AND KEEPING READY NETWORK CAPACITY AS WELL AS NETWORK MANAGEMENT UNIT FOR IMPLEMENTING THE METHOD

This application is based on and claims the benefit of German Patent Application No. 198 27 347.9 filed Jun. 19, 1998, which is incorporated by reference herein.

BACKGROUND OF THE INVENTION

The invention relates to a method for offering and keeping ready network capacity in a telecommunication network and a network management unit.

The introduction of competition in telecommunications has resulted in a situation that can hardly be compared with conventional business processes and that is now to be brought under control by technical means. The network capacity existing in a telecommunications network, frequently referred to as resources, is not marketed like merchandise, i.e., produced and sold, but leased comparable to real estate. One of the differences from leasing real estate, however, is the time periods to be taken into account. Real estate is typically leased long-term. Furthermore, it is usual to re-lease for the subsequent period as early as during the end phase of a tenancy. Except in special cases, even if an offer is submitted, there is no agreed upon reserve period during which this offer is valid exclusively for one applicant. In contrast, the network capacity in a telecommunications network is "leased" in different periods. On the one hand the switching equipment of the telecommunications network switches relatively short individual connections. On the other hand the communications equipment of the telecommunications network provides transmission channels with higher capacity over longer periods, whereby an offer phase may have to be taken into account during which the offered network capacity should actually be available in case of acceptance. During such an offer phase, the offered network capacity is therefore blocked in practice.

If on the one hand several offers are made at a given time and on the other hand the duration of the offer phases are not negligible compared to the subsequent lease periods, a part of the network that is technically fully available is in fact continually blocked.

SUMMARY OF THE INVENTION

An object of the invention is to define a method and a network management unit by means of which network capacity can be offered and kept ready without blocking an unnecessarily large amount of the technically fully available part of the network.

This object is attained according to the invention by a method and a network management unit described herein.

According to the invention, a parameter is introduced, which takes into account the probability of offer acceptance. Consequently, only a part of the offered network capacity is blocked.

Additional embodiments of the invention are set forth in the subclaims and in the following description.

BRIEF DESCRIPTION OF THE DRAWINGS

Below, the invention is further explained by means of the attached drawings:

FIG. 1 shows a segment of a telecommunications network in which the inventive method is used.

DETAILED DESCRIPTION OF THE INVENTION

A segment from a telecommunications network using the inventive method is first described with reference to FIG. 1.

The segment from the telecommunications network shows seven network elements NE1, ..., NE7 as well as transmission channels between network element NE1 and network elements NE3, NE4, and NE5, and between network element NE2 and network elements NE6 and NE7. Furthermnore, on network elements NE3, NE4, and NE5 and on network elements NE6 and NE7, connections A, ..., F are indicated.

The network elements NE1 and NE2 are interconnected by three transmission channels CH1, CH2, and CH3.

All types of transmission network nodes are possible for network elements NE. To be cited primarily are so-called cross connects, in which transmission channels with higher capacity, particularly on a higher multiplex level, are switched instead of individual connections. Cross connects are frequently used to provide leased lines. However, other types of multiplexers, i.e., so-called add-drop multiplexers, ADMs, are also feasible.

From the perspective of the network operator, it is of subordinate importance how a connection is physically realized. Operation in this case is primarily by logic channels with different transmission capacity. Below, these are variously referred to as transmission channels or simply as lines.

Connections A, ..., F can be connections of any type, such as connections of private branch exchanges, connections of other network operators or service providers, or also transitions to other self-owned network parts.

In the present example, the three transmission channels CH1, CH2, and CH3 between the network elements NE1 and NE2 will now be discussed. First, it is assumed that all three transmission channels are mutually equivalent and, in particular, have the same capacity.

FIG. 1 shows a situation in which three offers for these three transmission channels have been previously submitted. From Connection A on network element NE3, a line is to be switched to connection B on network element NE7; the assumed order probability (i.e., the probability that the offer of transmission capacity for this connection will be followed by an actual order to make the connection) is 100%. Furthermore, from connection C on network element NE4, a line is to be switched to connection D on network element NE7; and here the assumed order probability is 50%. Furthermore, from connection E on network element NE5 a line is to be switched to connection F on network element NE6; here the assumed probability is 80%. The total of the probabilities of obtaining an order for switching one of the three transmission channels CH1, CH2, and CH3 is thus 230%. With three transmission channels available, this probability could reach 300% (which would use up all of the three available channels) without any problems to be expected. Thus, an additional offer can be submitted as long as the order probability does not exceed 70%. To some extent, it is thus also possible to accept orders directly without a prior offer having to be submitted.

As long as such an additional offer has not been made, the remaining 70% are free. They can then be used, for example, for individual connections. The other 230%, however, must be reserved, i.e., they must be actually blocked. This is done from a network management unit, which is not depicted in FIG. 1. According to the invention, however, this network management unit does not only block network capacity; the invention assumes that the state of the art has already solved this problem perfectly well. Rather, according to the invention, already the individual offers together with their order probabilities are entered in the network management unit and taken into account by this unit.

In the simplest case, the number of the offered lines is entered as the offered network capacity and a percentage as the parameter for the probability of offer acceptance. To implement the invention, it is basically sufficient to weight, i.e. multiply, the offered network capacity with this parameter, to add the network capacity thus weighted to values previously taken into account and stored in a data memory, and then to block the total offered weighted network capacity as stored in the data memory.

Such a network management unit will in any case be equipped with a data processing unit for other reasons; for each individual offer, individual data such as number of offered lines and value assumed for probability of offer acceptance and entered will also have to be stored. Thus, the total offered weighted network capacity required according to the invention can be continually checked and also adapted to new situations.

Such a possible new situation is the acceptance of an offer. In the simplest case, the original probability is negated and added, i.e., it is set to zero and this line is deleted from the inventory to be leased. The same, but without deletion from the inventory to be leased, occurs when the offer is rejected. Offer acceptance could also be carried out by increasing the order probability to 100%. The line would then remain in the inventory to be leased but could not longer be offered to anyone else. Of course, with offer acceptance, the line must also be through connected and made actually available to the customer and must subsequently be charged. This, too, can be done automatically from the network management unit.

Time can also be taken into account as a factor that changes the situation. In the simplest case, the expiration of the term of the offer can be automatically classified as non-acceptance. However, a time-dependent change of the order probability can also be taken into account based on a specific input.

If an offer for which a low probability had been entered is accepted, it is possible that the available network capacity is no longer sufficient even for this order or at least for the remaining orders. It is then up to the provider of this network capacity to provide a remedy. This can be accomplished, however, by means known per se, e.g., by using alternative paths. This is a possible disadvantage of the present invention, which the provider will have to weigh against the advantages.

According to the invention, however, it is possible in such a case for the network management unit automatically to execute a rearrangement of previously occupied network capacities.

Other automatic mechanisms to simplify network management can also be introduced, such as rejection of new entries if this would cause the total offered weighted network capacity to exceed the network capacity still available, or output of a warning if after deduction of the total offered weighted network capacity the network capacity still available would fall below a specified limit.

The fact that the inventive method can be used not only to manage capacities of equal size but also capacities of different size and how this is to be accomplished taking into account the respective network capacity actually offered is readily apparent from the above description.

Finally, the present invention automatically takes into account the statistics when offering and keeping ready network capacity in a telecommunications network. As in all statistical methods, the result is all the better, the more mutually comparable or identical units are involved. However, it is left to the discretion of the provider to implement the inventive method using even only one unit.

The description of the method necessarily and implicitly describes the network management unit required therefore.

What is claimed is:

1. A method for offering and keeping ready network capacity in a telecommunications network comprising the steps of: entering into a network management unit a network capacity offered by a network operator to a potential consumer, together with a parameter representing a probability of offer acceptance by said potential customer; weighting the offered network capacity in accordance with said parameter in the network management unit; adding the network capacity thus weighted to values previously taken into account and stored in a data memory; and blocking by said network management unit the total offered weighted network capacity as stored in the data memory.

2. A method according to claim 1 characterized in that the input of new data is rejected if this would cause the total offered weighted network capacity to exceed the still available network capacity.

3. A method according to claim 1 characterized in that a warning is given following entry of new data if after deduction of the total offered weighted network capacity the still available network capacity falls below a specified limit.

4. A method according to claim 1 characterized in that the total offered weighted network capacity can be adjusted by the entry of new data if changes result regarding the probability of offer acceptance.

5. A method according to claim 1 characterized in that the network management unit automatically executes a rearrangement of the previously occupied network capacities in case of overload or after entry of a corresponding order.

6. A network management unit for offering and keeping ready network capacity in a telecommunications network, said network management unit comprising:

input means for allowing entry of a network capacity offered by a network operator to a potential consumer and a parameter representing a probability of acceptance by the potential customer of the capacity offered by the network operator;

weighting means for weighting the offered network capacity with said parameter;

adding means for adding the network capacity thus weighted to a weighted offered network capacity value previously stored in a data memory to obtain a new total weighted offered network capacity value; and blocking means for blocking network capacity in accordance with the new total weighted offered network capacity value.

7. A method according to claim 1, characterized in that an offer of capacity is considered not accepted upon lapse of a predetermined period of time without acceptance.

8. A network management unit according to claim 1, characterized in that an offer of capacity is considered not accepted upon lapse of a predetermined period of time without acceptance.

9. A network management unit according to claim 6, characterized in that said parameter corresponds to a probability of less than 100%.

10. A method according to claim 1, characterized in that said parameter corresponds to a probability of less than 100%.

* * * * *